Nov. 29, 1949  C. E. OATES  2,489,924
QUICK DISCONNECT UNIT
Filed Aug. 23, 1948  2 Sheets-Sheet 1
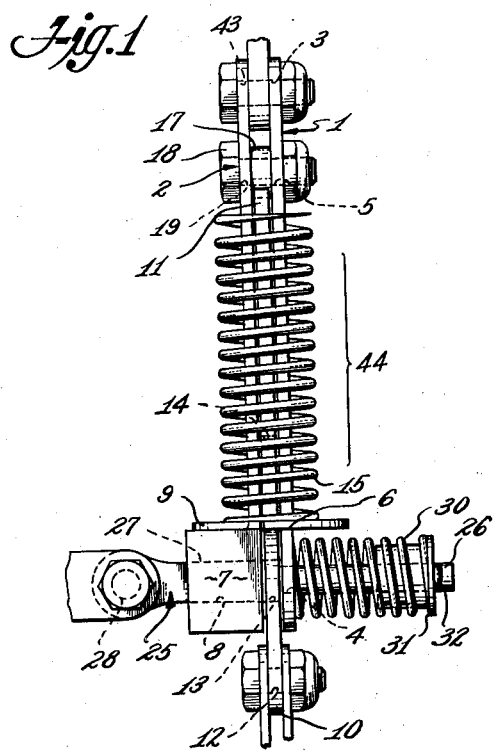
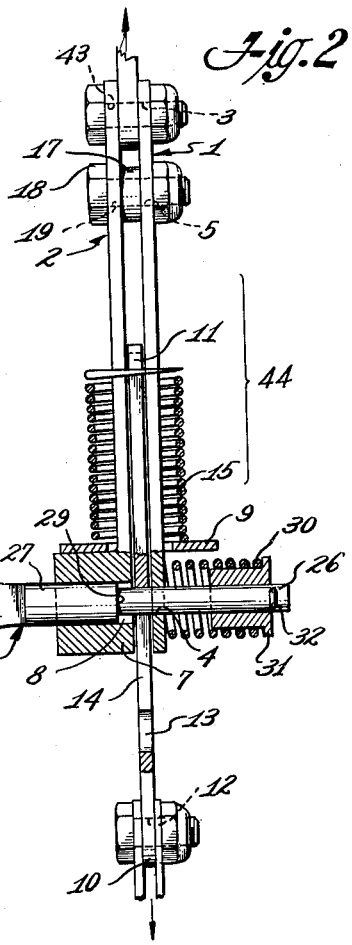
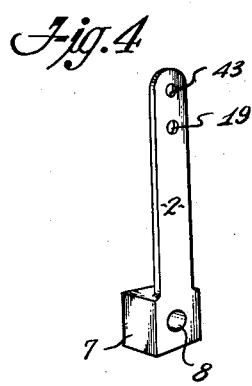
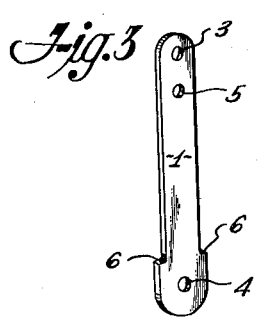
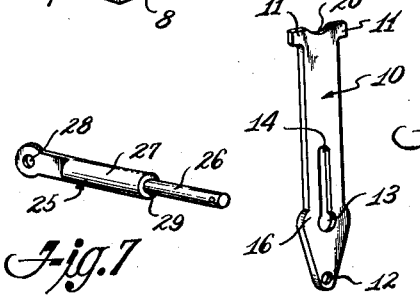
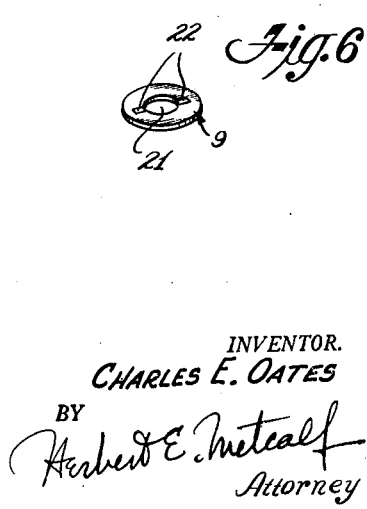
INVENTOR.
CHARLES E. OATES
BY
Herbert E. Metcalf
Attorney Nov. 29, 1949  C. E. OATES  2,489,924
QUICK DISCONNECT UNIT
Filed Aug. 23, 1948  2 Sheets-Sheet 2

INVENTOR.
CHARLES E. OATES
BY
Herbert E. Metcalf
Attorney

Patented Nov. 29, 1949

2,489,924

UNITED STATES PATENT OFFICE 2,489,924

QUICK DISCONNECT UNIT

Charles E. Oates, Gardena, Calif., assignor to Northrop Aircraft, Inc., Hawthorne, Calif., a corporation of California Application August 23, 1948, Serial No. 45,647

7 Claims. (Cl. 74—469)

This invention relates to cable disconnect devices, and, more particularly, to a means whereby a taut cable may be effectively disconnected by slackening or lengthening the cable assembly, and which may also be reset mechanically. The invention is particularly suitable for use in airplanes.

In airplanes with retractable landing gear, for example, gear uplocks and gear downlocks are provided to insure fixation of the gear assemblies in both the retracted and extended positions. These locks are frequently in the form of spring-loaded hooks connected by cables to the crew's control handle which controls power to be applied by the landing gear actuators. Generally, this control handle has three positions; namely, down, neutral, and up. When moved to the up position, for example, the handle will pull the downlock release cable to open the downlock so that the actuators, also energized by the control handle, can retract the gear. If the handle is inadvertently left in the up position, instead of being placed in neutral, this cable will remain taut, holding the downlock open.

Emergency landing gear extension systems are also commonly provided, particularly in military aircraft, to provide an alternate means of lowering the gear in the event any failure of the normal system should occur. In airplanes where the pilot and co-pilot are stationed in separate cockpits, a control for such an emergency release is preferably installed in each cockpit. If the emergency system were required to be used when the pilot's normal landing gear control handle was in the up position, and the pilot were incapacitated, the co-pilot's operation of the emergency release system would allow the gear to extend, but would not permit it to lock, since the downlock would be held open.

Accordingly, it is an object of this invention to provide a means for releasing the tension in a downlock cable in sequence with the operation of the co-pilot's or other crew member's landing gear emergency release. This might be achieved by the removal of a connecting pin between two sections of cable, or a similar method, merely letting the cable ends drop away free. However, this would require a rigging procedure to reassemble the separated parts, which would be unsatisfactory especially if someone were merely testing the device on the ground. It is another object of the present invention to provide a cable disconnect unit which can be easily and quickly reset to restore the cable to its original condition.

Briefly, the device consists of two sliding sections having cable attachment points, these sections being spring-loaded toward the contracted position, but able to slide to the expanded position when unlocked and pulled against the action of the spring. One end of the unit contains a spring-loaded release pin which holds the two sections in rigid relationship, or, when pulled, allows the unit to elongate a controlled amount, under tension. When tension on the unit is released, the sliding sections spring back to the contracted position and the release pin slips into place again.

This invention may be more readily understood by reference to the accompanying drawings, shown by way of illustration and not limitation, wherein:

Figure 1 is a side view of the cable disconnect unit of the present invention, showing the unit in the locked (contracted) position.

Figure 2 is a side view similar to Figure 1, showing the cable disconnect unit in the elongated position. Arrows on this figure indicate a tensile force applied.

Figures 3 through 7 are isometric views showing the major detailed parts of the assembly in Figures 1 and 2.

Figure 8:
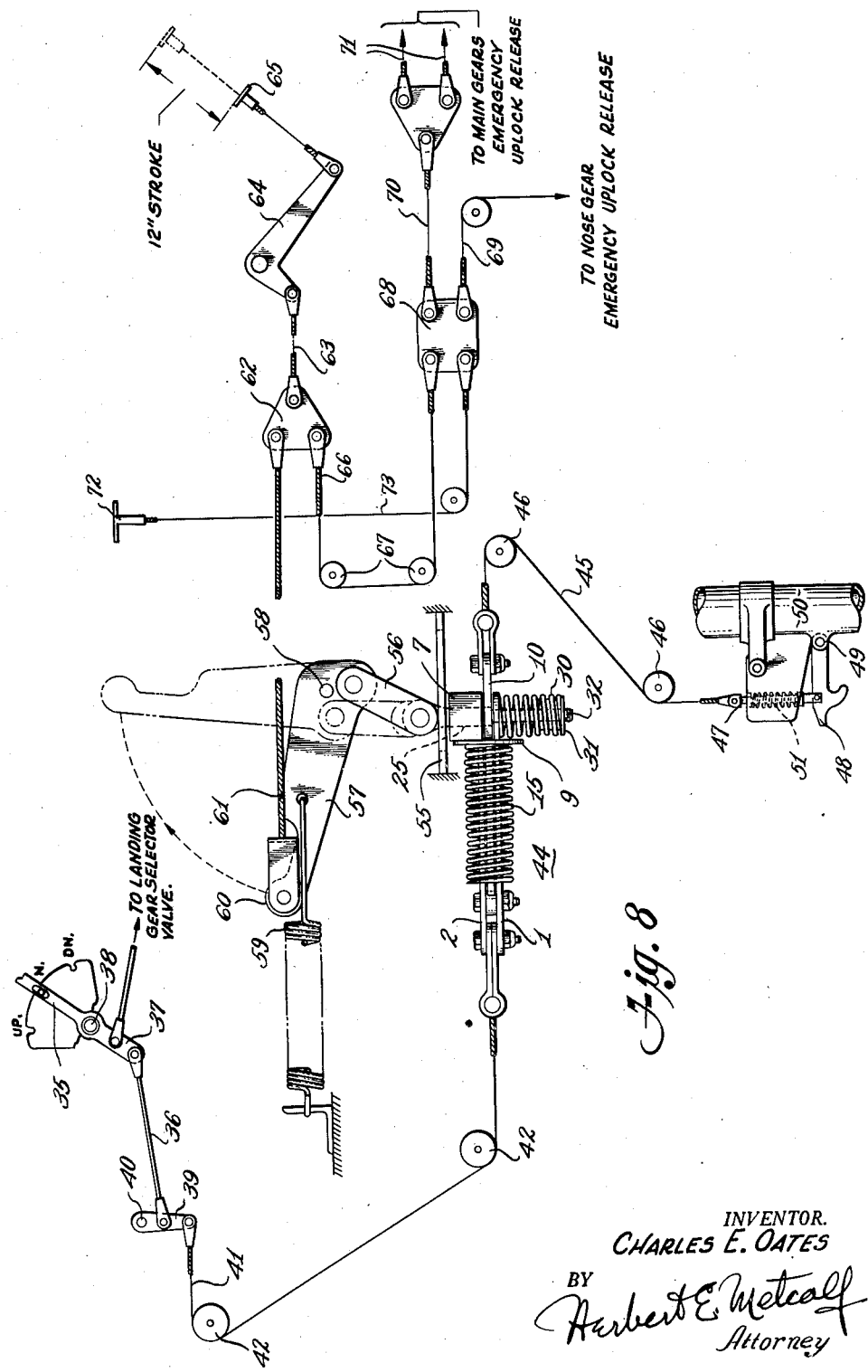
Figure 8 is a diagram showing the cable disconnect unit of the present invention incorporated in a portion of an airplane landing gear control cable system.

Referring to Figures 1 through 7, the two side pieces of the disconnect unit consists of a plate 1 and a guide 2. The plate 1 (Figure 3) is a flat piece of metal having a cable attachment hole 3 near the top, a pin hole 4 near the bottom, and a bolt hole 5 under the cable attachment hole 3. The plate is of constant width except for near the bottom end, where it widens sharply on each side to form short horizontal surfaces 6. The guide 2 (Figure 4) is similar to the plate 1 with respect to length, width, and hole locations, but the bottom end of one face forms a thick block 7. The guide pin hole 8, through the block 7, is larger in diameter than the plate pin hole 4. The plate 1 and guide 2 are placed face to face and a retainer 9 (Figure 6) is dropped over the tops of both to rest on the guide block 7.

A link 10 (Figure 5), to fit between the guide 2 and plate 1, is a flat metal piece having short ears 11 projecting horizontally from both sides of the top. A link cable attachment hole 12 is provided through the bottom of the link 10. Above this hole is located a link pin hole 13 of slightly larger diameter than the guide pin hole 8. A link slot 14 of substantially the same width as the diameter of the plate pin hole 4 intersects the top of the link pin hole 13 and extends upwardly along the center line of the link 10. A reset spring 15 fits around the link 10, and can be installed by screwing the link ears 11 through the spaces between the spring coils. When installed around the link 10, the reset spring 15 is compressed slightly between the link ears 11, over which the spring cannot pass, and a widened portion 16 adjacent the link pin hole 13.

This combination of link 10 and reset spring 15 is now added to the plate 1 and guide 2. The bottom of the link 10, which is inserted between the plate 1 and guide 2, extends through the retainer 9, while the reset spring 15, fitting over the plate and guide, rests against the retainer 9. A spacer 17 is then placed between the plate 1 and guide 2, and a bolt 18 is installed through the guide bolt hole 19, spacer 17, and plate bolt hole 5. The spacer 17 contacts a dished out arc 20 in the top of the link 10 and this holds the assembly together with the three pin holes 4, 13, and 8 in line. The retainer 9 is bearing against the guide block 7 and the horizontal surfaces 6 of the plate 1. The central hole 21 of the retainer 9 is of the proper diameter to snugly enclose the plate 1, link 10, and guide 2, and radial cuts 22 in the retainer inside diameter permit passage of the widened portion 16 of the link 10 for assembly purposes.

A release pin 25 (Figure 7) is formed to have a small diameter shank 26 at one end, a large diameter shank 27 near the center, and an eye 28 at the other end. The small diameter shank 26 fits the plate pin hole 4 and the link slot 14, while the large diameter shank 27 fits only the link pin hole 13 and the guide pin hole 8. Thus, when the release pin 25 is inserted from the guide pin hole 8 side of the assembly, the large diameter shank 27 will enter the link pin hole 13, but will stop with the pin shoulder 29 against the face of the plate 1. The small diameter shank 26 passes through all pin holes and protrudes from the other side where it is provided with a release spring 30, plug 31, and cotter pin 32, so that the release pin 25 is spring-urged to the farthest possible "in" position at all times. The above described position is the one shown in Figure 1, where the link 10, plate 1, and guide 2 are locked together by the release pin 25 to form a rigid assembly.

If, now, the release pin 25 is withdrawn far enough to remove the large diameter shank 27 from the link pin hole 13, the link 10 may be pulled downwardly while the plate 1 and guide 2 are held stationary. This procedure allows the link slot 14 to move across the small diameter shank 26 of the release pin 25 and causes the reset spring 15 to be compressed, being pulled downwardly by the link ears 11. This is the position shown in Figure 2, where the upper end of the link slot 14 contacts the release pin 25 and prevents further elongation. When all tension on the link 10 and release pin 25 is removed, the reset spring 15 will force the link 10 back to its retracted position, where the release spring 30 will force the release pin 25 inwardly to its initial locking position.

The objects of this invention as set forth in the introduction can be, and have been, successfully accomplished by using the above described disconnect unit in an airplane landing gear control cable system such as the one shown in Figure 8. This diagram shows the normal cable release of a typical landing gear downlock and the actuating elements of an emergency landing gear extension system.

A landing gear control lever 35 is positioned at the pilot's station in the aircraft. This lever has three positions in which it can be placed and latched by the pilot. These are up, down, and neutral, the latter located approximately midway between the first two. The neutral position is normally used as flight after the hydraulically-operated gear has reached the up and locked position. One reason for this is to remove pressure from the gear hydraulic lines and actuators, and it allows the gear to ride resting on the uplock hooks.

Besides operating the gear actuators (not shown), the control lever 35 has a push-pull rod 36 pin-connected to its lower end 37 below the lever pivot point 38. This rod 36 is in turn pin-connected to an arm 39 rotating about a fixed pivot 40. Also attached to the arm 39 is an arm cable 41 which leads over pulleys 42 to connect to the plate cable attachment hole 3 and guide cable attachment hole 43 of the cable disconnect unit 44. Connected to the link cable attachment hole 12 is a downlock cable 45 which leads over pulleys 46 to attach to a downlock rod 47. The downlock rod 47 connects to the top of a downlock hook 48 pivoted to a lug 49 on the gear assembly 50. The downlock hook 48 is spring-loaded in the locked direction by a downlock spring 51 acting on the downlock rod 47. The pilot's control lever 35 is thus directly connected to the downlock hook 48. When the control lever 35 is moved forward to the up position, with the cable disconnect unit 44 in the locked position as described before, the pushpull rod 36 will pull the arm 39 and cable assemblies, which will pull the downlock rod 47 against the action of the downlock spring 51, lifting the downlock hook 48 to the open position, to release the gear.

It will be noted from the above that as long as the pilot's control lever 35 is left in the up position, the downlock hook 48 will remain open unless the interconnecting cable is disconnected or slackened. However, with the cable disconnect unit 44 installed directly in the cable line as described, slackening of the cable is readily accomplished by pulling the release pin 25 outwardly. The downlock spring 51 is purposely made stronger than the reset spring 15 even in the fully compressed position of the latter, so that when the release pin 25 is pulled, enough tension is acting on the cable line to elongate the disconnect unit 44 as previously described.

The cable disconnect unit 44 is tied in with the emergency landing gear release as follows. The eye end of the release pin 25 rides in a slotted fairlead 55 attached to the airplane structure so that normal downlock cable travel will not be impeded, yet the disconnect unit 44 will be kept from rotating. Connected to the release pin eye 28 is a bellcrank link 56 in turn pin-connected to a bellcrank 57. The bellcrank 57 is mounted on a fixed pivot 58 above the connection to the bellcrank link 56 and directly above the center of the fairlead slot. When the pilot's control lever 35 is moved through its range of travel, the disconnect unit will move in a slightly arcuate path, with the bellcrank link 56 rotating about its connection to the stationary bellcrank 57. The bellcrank 57 is held in the locked (inoperative) position of the emergency controls by a bellcrank spring 59 fixed to the airplane structure. Fore-and-aft travel of the disconnect unit 44 cannnot cause the release pin 25 to be pulled.

Connected to the upper end 60 of the bellcrank 57 is a bellcrank cable 61 leading away in a direction opposite to the pull of the bellcrank springs 59. This cable 61 passes aft to a three-way cable link 62 to which is connected a co-pilot's emergency release cable 63. The co-pilot's cable 63 leads to a handle crank 64 and pull handle 65 at the co-pilot's station of the aircraft. Also connected to the three-way cable link 62 is an emergency uplock release cable 66 leading over pulleys 67 to a four-way cable link 68. Both the bellcrank cable 61 and the emergency uplock release cable 66 are pulled by the co-pilot's cable 63.

A nose gear uplock cable 69 and a primary main gear uplock cable 70 are connected to the four-way cable link 68 to be pulled by the emergency uplock release cable 66. The primary main gear uplock cable 70 divides further into two secondary cables 71, one for each of the two main landing gears. A pilot's emergency gear release handle 72 fastened to a pilot's emergency release cable 73 is also provided to pull the main and nose gear uplock cables 70 and 69 through the four-way cable link 68.

Thus it is seen that the co-pilot's emergency release handle 65, when pulled through its stroke of about 12 inches, will release all three gear assemblies from their uplocks and then operate the disconnect unit 44 to be sure the downlock hook 48 will not be held open. When the bellcrank cable 61 rotates the bellcrank 57 during this operation, the guide block 7 of the disconnected unit 44 will butt against the edges of the fairlead 55, assuring the withdrawal of the release pin 25. This released position of bellcrank 57 and bellcrank link 56 is indicated by the dotted lines in Figure 8.

If the pilot's control lever 35 is in the up position, the downlock cable 45 will be lengthened to release the downlock hook 48 as previously described, when the co-pilot's emergency release handle 65 is pulled. If the pilot's control lever 35 is in the neutral or down position, the release pin 25 will be pulled as usual, but the disconnect unit 44 will merely remain in its contracted position, since the required tension is not acting on it when the downlock hook 48 is already released.

While the present invention has been shown as embodied in an airplane landing gear downlock release cable, it is to be understood that this invention is in no way limited to this specific embodiment, since it is obvious that other apparatus, such as a rigid mechanical linkage, for example, may utilize the same method as herein described.

What is claimed is:

1. A mechanical linkage comprising an actuator and a device to be actuated, a pair of adjacent slideable members, means for elastically connecting said members to urge said members to a predetermined relative position, means connecting one of said members to said actuator, means connecting the other of said members to said device, means elastically urging said device to an urged limit position, the urge on said device opposing and being greater than the elastic urge between said members to permit relative motion between said members when said actuator is moved tending to move said device away from its urged limit position, member locking means carried by one of said members and elastically urged to a locking connection with the other member when said members are in said predetermined position only, whereby said device can be directly moved by said actuator, and a second actuator attached to said member locking means to break said locking connection thereby permitting said device to return to its urged limit position when first said actuator is holding said device away from its urged limit position when said members are locked.

2. Apparatus in accordance with claim 1, wherein said member locking means carried by one of said members is a pin having a shank passing through a slot in the other of said members and having a shoulder too large to enter said slot, but shaped and spring-loaded to enter a hole at the end of said slot when said members are in said predetermined position, thereby obtaining said locking connection, the ends of said slot acting as stops to limit the relative motion between said members in either direction.

3. Apparatus in accordance with claim 1, wherein said member locking means carried by one of said members is a pin having a shank passing through a slot in the other of said members and having a shoulder too large to enter said slot, but shaped and spring-loaded to enter a hole at the end of said slot when said members are in said predetermined position, thereby obtaining said locking connection, the ends of said slot acting as stops to limit the relative motion between said members in either direction, and wherein a guide is provided positioning and holding said pin in a path providing sufficient linear motion of said members during normal operating travel of said linkage, said guide including a surface contacting one of said members during operation of said second actuator to facilitate complete unlocking of said members.

4. An airplane landing gear downlock releasing linkage comprising a pilot's operating lever and a landing gear downlock hook, a pair of adjacent slideable members, means for elastically connecting said members to urge said members to a predetermined relative position, a cable connecting one of said members to said pilot's lever, a second cable connecting the other of said members to said downlock hook, a spring urging said downlock hook to a locking position, the spring load on said hook opposing and being greater than the elastic urge between said members to permit relative motion between said members when said pilot's lever is moved tending to pull said hook to its unlocking position, member locking means carried by one of said members and elastically urged to a locking connection with the other member when said members are in said predetermined position only, where said hook can be directly pulled to its unlocking position by said pilot's lever, and a co-pilot's handle attached to said member locking means to break said locking connection by moving said member locking means against its elastic urge, thereby permitting said hook to return to its locking position when said pilot's lever is holding said hook in its unlocking position when said members are locked.

5. Apparatus in accordance with claim 4, wherein said member locking means carried by one of said members is a pin having a shank passing through a slot in the other of said members and having a shoulder too large to enter said slot, but shaped and spring-loaded to enter a hole at the end of said slot when said members are in said predetermined position, thereby obtaining said locking connection, the ends of said slot acting as stops to limit the relative motion between said members in either direction.

6. Apparatus in accordance with claim 4, wherein said member locking means carried by one of said members is a pin having a shank passing through a slot in the other of said members and having a shoulder too large to enter said slot, but shaped and spring-loaded to enter a hole at the end of said slot when said members are in said predetermined position, thereby obtaining said locking connection, the ends of said slot acting as stops to limit the relative motion between said members in either direction, and wherein a guide is provided positioning and holding said pin in a path providing sufficient linear motion of said members during normal operating travel of said linkage, said guide including a surface contacting one of said members during operation of said co-pilot's handle to facilitate complete unlocking of said members.

7. Apparatus in accordance with claim 4, wherein said pilot's lever is connected to also control operation of landing gear actuators for normal extension and retraction of the landing gear assemblies, said control connection being synchronized with said downlock linkage so that said downlock hook is pulled to its unlocking position as said actuators are reaching their gear up position, and so that said hook is returned to its locking position when said actuators are in the neutral or gear down positions, these synchronized operations occurring as recited when said members are locked in said predetermined relative position.

CHARLES E. OATES.

No references cited.